(12) United States Patent
Ruck

(10) Patent No.: US 6,449,581 B1
(45) Date of Patent: *Sep. 10, 2002

(54) COORDINATE MEASURING APPARATUS

(75) Inventor: Otto Ruck, Ellwangen-Pfahlheim (DE)

(73) Assignee: Carl-Zeiss-Stiftung, Heidenheim (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/481,867

(22) Filed: Jan. 12, 2000

(30) Foreign Application Priority Data

Jan. 12, 1999 (DE) .......................................... 199 00 724

(51) Int. Cl.[7] ........................... G05B 19/19; G01B 5/008
(52) U.S. Cl. ....................... 702/152; 702/153; 702/168; 33/504
(58) Field of Search ................................. 702/152, 153, 702/168, 95; 33/503, 504; 700/717; 73/1.41

(56) References Cited

U.S. PATENT DOCUMENTS

| | | | |
|---|---|---|---|
| 5,339,439 A | 8/1994 | Latimer et al. ................ 710/32 |
| 5,471,406 A | 11/1995 | Breyer et al. ................ 702/168 |
| 5,594,668 A * | 1/1997 | Bernhardt et al. ........... 702/168 |
| 5,726,917 A | 3/1998 | Staaden ....................... 702/168 |
| 6,154,713 A * | 11/2000 | Peter et al. .................... 702/95 |
| 6,260,002 B1 * | 7/2001 | Ishii ............................ 702/168 |

* cited by examiner

Primary Examiner—Kamini Shah
(74) Attorney, Agent, or Firm—Walter Ottesen

(57) ABSTRACT

The invention is directed to a coordinate measuring apparatus having drives (14, 23) for moving the components (2, 7) of the apparatus. The drives are displaced in accordance with sets of desired drive values ($L_i$, $F_{des}$) which are sequentially pregiven at a fixed clock frequency. The operation of the control can be integrated into a control computer unit (3, 4, 5) by making available a control computer unit (3, 4, 5) having an operating system without real-time performance in which the desired drive values ($L_i$, $F_{des}$) are correspondingly computed as well as by providing a subassembly (1) wherein the desired drive values ($L_i$, $F_{des}$) can be stored and driven to at subsequent clock pulses in advance in response to a command of the control computer unit (3, 4, 5). The subassembly (1) executes at least one of the following functions: automatically outputting the sets of desired drive values to the plurality of drives at the fixed clock frequency and/or storing the measurement values ($X_T$, $Y_T$, $Z_T$, $X_m$, $Y_m$, $Z_m$, $F_{ix}$, $F_{iy}$, $F_{iz}$) and transmitting the measurement values ($X_T$, $Y_T$, $Z_T$, $X_m$, $Y_m$, $Z_m$, $F_{ix}$, $F_{iy}$, $F_{iz}$) to the control computer unit in response to a command therefrom.

13 Claims, 2 Drawing Sheets

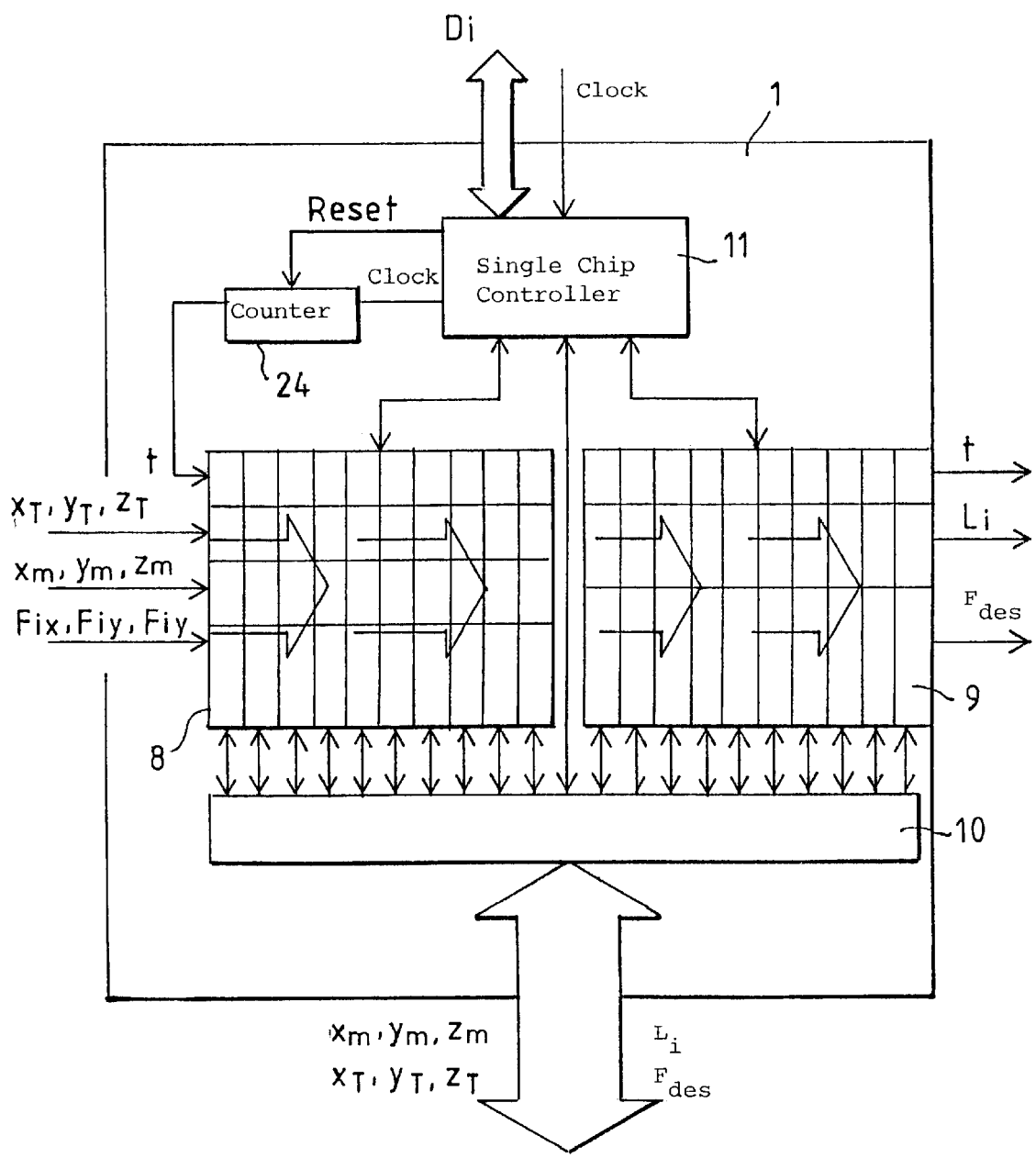

COORDINATE MEASURING APPARATUS

FIELD OF THE INVENTION

The invention relates to a coordinate measuring apparatus having drives for adjusting the components of the apparatus. The drives are adjusted sequentially at a fixed defined clock frequency in accordance with pregiven desired drive values. The invention also relates to a method for operating the coordinate measuring apparatus.

BACKGROUND OF THE INVENTION

A coordinate measuring apparatus of this kind is already known from the state the of the art and is described in detail, for example, in U.S. Pat. Nos. 5,471,406 and 5,726,917. In the coordinate measuring apparatus shown herein, first data as to the geometric elements of the workpiece to be measured are transmitted from a computer to a control arrangement. The control arrangement then generates desired drive values from the data and these values are transmitted further to the drives of the coordinate measuring apparatus. For example, the control arrangement generates so-called desired position values which are sequentially transmitted to the position control loops of the drives for moving the probe head in the three coordinate measuring directions in a fixed defined clock frequency and are then correspondingly executed by the drives. The same is true for the desired measuring force which is imparted to the probe pin via the measuring force generators. This desired measuring force too is computed in advance in correspondence to the geometry of the geometric element to be scanned and is correspondingly transmitted to the measuring force generators during scanning.

During scanning of the workpiece, the respective machine positions of the probe head in the three coordinate measuring directions as well as the probe pin deflection are detected and are evaluated in the control arrangement.

The desired drive values, which are generated by the control arrangement, are so computed that they are applied to the drives sequentially at a clock frequency because, otherwise, problems could occur in the measuring sequence. For example, the desired position values are so computed that the drives move the probe head in accordance with a velocity profile and an acceleration profile. If the desired position values are, however, not sequentially moved to precisely at the clock frequency as a function of time, then this can lead to excessively large braking and start-up accelerations in the drives of the coordinate measuring apparatus which can rapidly lead to excessive loading of the apparatus.

Stated otherwise, it is of equal importance that the measured measurement values (such as the probe pin deflection, that is, the deflection of the probe pin relative to the probe head) or the machine positions (that is, the positions of the probe head in the machine coordinate system) are always correctly detected as a function of time because, otherwise, individual measuring points (which measuring points are required for the evaluation of measurement data as well as for readjusting the precomputed desired position values) could no longer be correctly evaluated.

In the coordinate measuring apparatus disclosed in U.S. Pat. Nos. 5,471,406 and 5,726,917, this real time performance is achieved in that the individual components of the control arrangement are configured as microprocessors which exhibit a very good real time performance and for which making ready the desired position values for the control loops of the drives as well as the detection of the measured values define no problems whatsoever.

In recent times, there are more cost-effective and more powerful computers available in the marketplace so that increasingly the desire develops to let the central processor of the evaluating computer execute the operation of the control arrangement which, up to now, has been performed by microprocessors. However, this desire could not be realized without considerable additional complexity because the operating systems for the corresponding computers, which are today available such as UNIX, LINUX, WINDOWS 95, WINDOWS NT, et cetera, have no or only an inadequate real time performance. Real time performance is here understood to be that the computer exhibits time spans of longer than 0.1 milliseconds in which the computer cannot transmit desired drive values to the drives and in which the computer likewise cannot receive measured values.

Implementing the control units as software in a computer of this kind would perforce lead to the condition that some generated desired drive values would be lost with the consequence that, for example, the mechanics of the coordinate measuring apparatus would thereby be inexorably overloaded or that individual measured values would be lost which would lead to the condition that a reasonable readjustment of the desired position values or a reasonable evaluation of the measured values could no longer be ensured.

SUMMARY OF THE INVENTION

It is an object of the invention to provide a coordinate measuring apparatus wherein as many functions of the control arrangement as possible can be taken over by a computer having an operating system without real time performance as well as a method with which this is possible.

The coordinate measuring apparatus of the invention has a component unit for measuring a workpiece and the apparatus includes: a plurality of drives for moving the component unit to scan the workpiece; a control computer for sequentially generating pregiven sets of desired drive values ($L_i$, $F_{des}$) in accordance with which the drives are correspondingly adjusted at a fixed clock frequency; scanning devices for detecting several measured sets of values ($X_T$, $Y_T$, $Z_T$, $X_m$, $Y_m$, $Z_m$, $F_{ix}$, $F_{iy}$, $F_{iz}$) at the fixed clock frequency during a measuring sequence; the control computer having an operating system without real-time performance wherein the desired drive values are computed; a subassembly operating to execute at least one of the following functions: (a) several sets of the desired drive values are stored in advance in response to a command of the control computer and to which the drives are to be moved in the next clock pulses; and, automatically outputting the sets of desired drive values to the plurality of drives at the fixed clock frequency; and, (b) storing the measurement values ($X_T$, $Y_T$, $Z_T$, $X_m$, $Y_m$, $Z_m$, $F_{ix}$, $F_{iy}$, $F_{iz}$) and transmitting the measurement values ($X_T$, $Y_T$, $Z_T$, $X_m$, $Y_m$, $Z_m$, $F_{ix}$, $F_{iy}$, $F_{iz}$) to the control computer in response to a command therefrom.

The basic idea of the invention is seen in that the desired drive values are computed in a control computer having an operating system without a real time characteristic. A subassembly is made available in which at least one of the following functions is executed: (a) several desired position values, which are to be executed in subsequent cycles, are stored in advance in response to commands of the control computer and the subassembly automatically transmits the desired position values, which are stored in advance, to the drives at the clock frequency; and, (b) several measured values, which are recorded at a pregiven clock frequency, are stored in the subassembly and are transmitted for evaluation to the control computer in response to a command of the control computer.

This affords the advantage that now almost all control functions can be carried out with a very cost-effective control computer having an operating system without a real time characteristic and that no desired drive values and/or measured values are lost.

Various values can be considered as possible desired drive values. The desired drive values can be desired position values (with which the drives are driven to move the probe head in the three coordinate directions) and desired measurement force values via which the measurement force generators are driven if the probe head is a measuring probe head. For example, for the case that a one-dimensionally measuring optical probe head is utilized as a probe head, which is attached to a rotational-pivot unit, the desired drive values can also be the desired rotational angles to be set by the rotational pivot unit.

The measurement values can likewise vary in many ways. Usually, the measurement values include the so-called machine position of the probe head, that is, the precise position of the probe head in the machine coordinate system. This machine position is achieved by reading off scales via corresponding scanning heads. The scales are mounted on the mechanics for moving the probe head in the individual coordinate directions and provide the machine positions in the individual measuring directions (x, y, z).

The measurement signal of the probe head is a usual measured value. In the case, for example, of a so-called measuring probe head (wherein a probe pin is journalled so as to be movable relative to the probe head), the measured value is the deflection of the probe pin out of its rest position. In an optical probe head, for example, the measured value is the spacing of the surface of the workpiece to the probe head. If the probe head is a measuring probe head with active measuring force generators, it can be additionally advantageous to detect the actually adjusted measuring forces. Further possible measurement values would be the adjusted rotational angle as well as the adjusted pivot angle of a rotation-pivot unit.

In an especially advantageous embodiment of the invention, the desired drive values and/or the measurement values are stored together with time data in the subassembly which outputs the time point in the measuring sequence at which the particular desired drive value is driven to and/or the measurement values are detected. In this way, the desired drive values, which are stored in the subassembly, as well as the measurement values can be arranged in time in the measuring sequence. The time information can, for example, be the cumulative number of clock flanks of the clock signal since the start of the measuring sequence. The time information for the measurement values can be simply determined by a counter which counts the clock flanks of the clock signal and which is reset at the start of the measuring sequence. In contrast, the time information of the desired drive values must be computed in advance by the control computer.

The components of the subassembly can be built up, in the simplest case, of simple hardware components and, for this purpose, can include at least one or several shift registers as well as, as required, a counter for the time information and/or a read-write subassembly via which the shift register is loaded and read out by the control computer as desired. With the clock pulse signal, the desired drive values and/or the detected measurement values are shifted further in the shift register(s), as required, together with the corresponding time data each by one memory location. The counter optionally supplies the above-mentioned time information and is likewise incremented at the clock frequency of the subassembly. The read-write subassembly, when driven by the computer, reads out or writes into the shift register.

In a somewhat more complex configuration, a single-chip controller can be additionally provided via which the shift registers and, if required, the counter and the read-write subassembly can be driven and administered. In this way, the performance of the individual components can be coordinated in a targeted manner and, if needed, also changed. Individual components or all components, such as the counter, can be emulated directly by the single-chip controller.

The object of the invention can also be realized only by a microprocessor which emulates the individual components completely by a corresponding program. To emulate the shift register and the read-write subassembly, the microprocessor can reserve a memory region of the microprocessor and organize the read-and-write operations controlled by the program in the same manner as the above-described operation of the shift register and of the read-write subassembly. Storage of the above-mentioned desired drive values in response to a command of the computer into different storage locations and the transmission of the desired drive values in correspondence to the applied clock signal to the drives as well as the storage of the measured measurement values at the correct clock frequency and the read-out of the measured values to the control computer are realized exclusively in the microprocessor.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
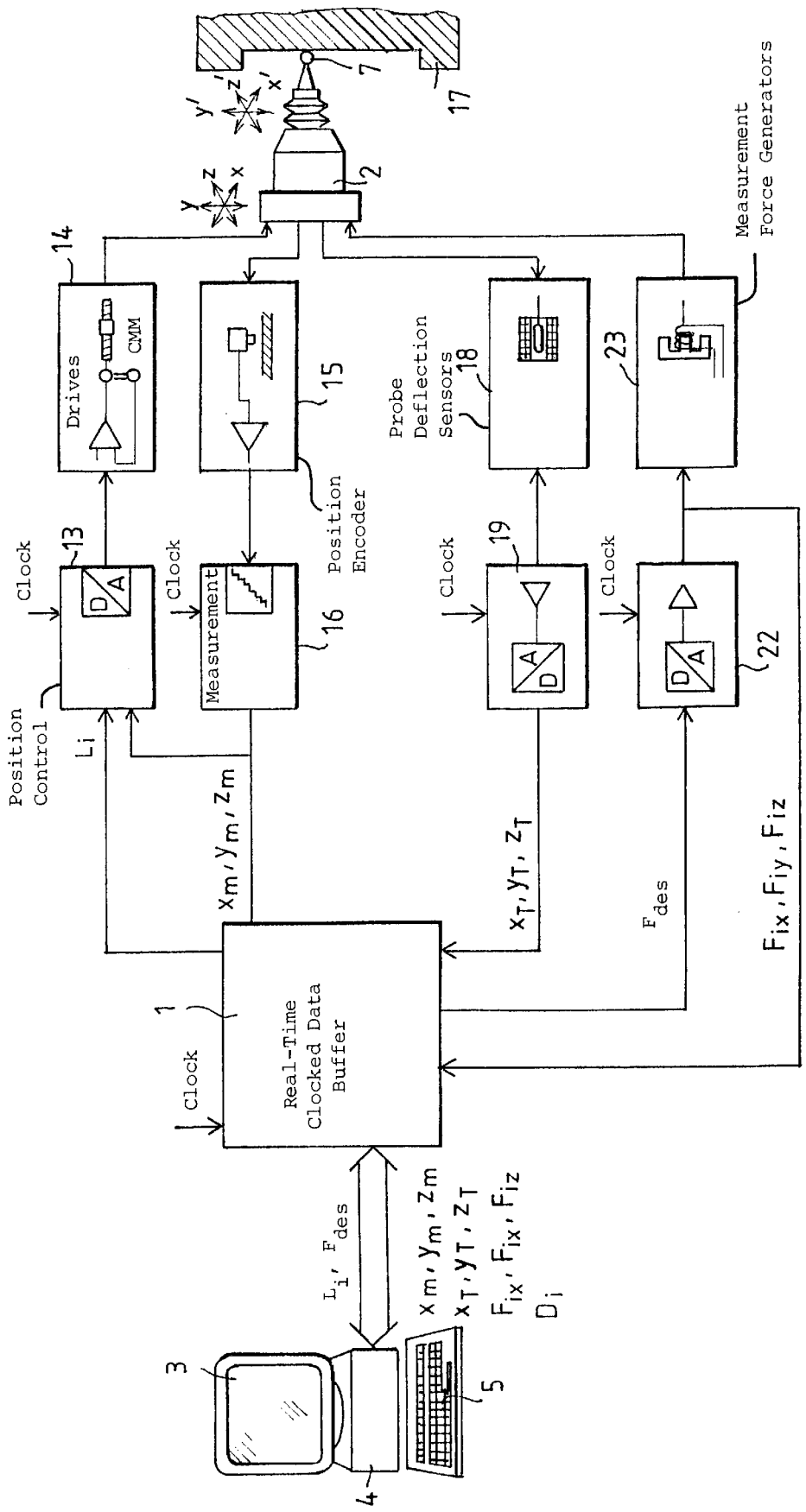
FIG. 1 is a schematic block diagram of a control arrangement of a corresponding coordinate measuring apparatus; and, FIG. 2 is a detailed schematic of the subassembly identified in FIG. 1 as "real-time clocked data buffer".

FIG. 1 is an overview schematic diagram of the control arrangement of a coordinate measuring apparatus. The control arrangement functions essentially in the manner that first a so-called desired position value $L_i$ is computed from the data of a geometric element to be measured on a workpiece surface. The drives 14 are driven to move the probe head in the three coordinate directions (x, y, z) in accordance with these desired position values $L_i$. The desired position values $L_i$ provide the precise position for each of the three drives in the three coordinate directions for a fixed time point and are sequentially processed in accordance with a clock frequency. The desired position values $L_i$ are transmitted to the position controller 13 which drives the drives 14 in the three coordinate directions (x, y, z) in accordance with the desired position values. The exact position ($X_m$, $Y_m$, $Z_m$) of the probe head in the machine coordinate system can be measured via corresponding path measuring units 15, that is, scales and corresponding sensors for reading the scales. The exact position ($X_m$, $Y_m$, $Z_m$) of the probe head can be fed back via the subassembly 16 identified as "measurement" to, on the one hand, the position controller 13 in order to readjust correspondingly and, on the other hand, to the control computer unit (3, 4, 5) in order to be able to evaluate the measurement results.

In the same manner, the control arrangement likewise generates so-called desired measurement forces ($F_{des}$) with which the probe pin 7 is charged in the three coordinate directions (x, y, z) relative to the probe head 2 by corresponding measurement force generators 23. The corresponding measurement forces are likewise computed in the control arrangement and are computed in such a manner that they are directed perpendicularly to the workpiece surface at the particular measurement point. The components of the measurement force vector are transmitted to a subassembly 22 which, in turn, drives the measurement force generators 23 in the probe head 2. The effectively adjusted actual measuring force ($F_{ix}$, $F_{iy}$, $F_{iz}$) can be measured based on the respective currents flowing through the individual measuring force generators and correspondingly fed back to the control computer unit (3, 4, 5). This is so if the measurement force generators 23 are, for example, electromagnetic linear motors. Furthermore, the deflection of the probe pin 7 relative to the probe head 2 is measured in the three coordinate measuring directions via corresponding sensors 18 in the probe head 2 and is transmitted as a so-called probe pin deflection ($X_T$, $Y_T$, $Z_T$) likewise to the control computer unit (3, 4, 5) for measurement data evaluation and, if required, for feedback to and superposition on the desired position values.

A control arrangement of the above kind is shown in detail in U.S. Pat. Nos. 5,471,406 and 5,726,917, incorporated herein by reference.

As described above, substantial efforts have been undertaken in recent times to configure increasingly the individual components of the control arrangement (which were configured in the above-mentioned documents as individual microprocessors having their own firmware) so that their function can be assumed by the central unit of the control computer unit (3, 4, 5). As already described, the very considerable problem is present that no operating systems capable of real time operation are present in present day computers so that a supply, at correct times, of the desired drive values (that is, for example, the desired position values $L_i$) to the position controller 13 or a chronological detection of the measurement values (such as the machine positions ($X_m$, $Y_m$, $Z_m$) and the probe pin deflection ($X_T$, $Y_T$, $Z_T$)) to the control computer (3, 4, 5) cannot be ensured. The operating programs UNIX, LINUX, WINDOWS NT, WINDOWS 98, et cetera are included in those operating systems which are not capable of real time operation.

In order to meet these requirements, the control arrangement of FIG. 1 includes a subassembly 1 identified as "real-time clocked data buffer" in which several desired drive values ($L_i$, $F_{des}$) are stored in advance in response to a command of the control computer unit (3, 4, 5). The desired drive values ($L_i$, $F_{des}$) are to be moved to in the following sequences and are automatically transmitted at the clock frequency to the drives (14, 23) of the coordinate measuring apparatus. In this way, the desired drive values ($L_i$, $F_{des}$) can be computed in the control computer unit (3, 4, 5) with an operating system without real-time characteristic and nonetheless supply the pregiven desired drive values ($L_i$, $F_{des}$) at correct times to the drives (14, 23) sequentially at a fixedly defined clock frequency.

In the same manner, the detection, at correct times, of the measured measurement values has to be taken care of, namely, the measured machine positions ($X_m$, $Y_m$, $Z_m$), the measured probe pin deflection ($X_T$, $Y_T$, $Z_T$) and the actual measurement force ($F_{ix}$, $F_{iy}$, $F_{iz}$). The subassembly likewise stores in a time-correct manner several measurement values detected at the pregiven clock frequency sequentially one after the other in the subassembly 1 and transmits these measured values to the control computer (3, 4, 5) in response to a command therefrom for evaluation and for position control.

The particular values together with time data should be stored in the subassembly 1 in order to chronologically allocate in each case individual data, that is, the desired drive values ($L_i$, $F_{des}$) and the measured values ($X_m$, $Y_m$, $Z_m$; $X_T$, $Y_T$, $Z_T$; $F_{ix}$, $F_{iy}$, $F_{iz}$). These values provide the time point in the measurement sequence at which the particular desired drive value is to be moved to and/or the measurement values are detected. In this way, a clear allocation of the particular values to the time-dependent sequence can be reconstructed even after the fact.

A schematic as to how the subassembly 1 can be built up is shown in FIG. 2. Referring to FIG. 2, the subassembly 1 includes two shift-register type memories (8, 9) having memory locations which are shifted to the right by one memory location per clock pulse via a single-chip control 11. The left shift register 8 has stored therein the measurement values which include, for example, the probe pin deflection ($X_T$, $Y_T$, $Z_T$), the machine position ($X_m$, $Y_m$, $Z_m$) as well as the actual measurement force ($F_{ix}$, $F_{iy}$, $F_{iz}$) As can be seen, the actual measurement values are inputted into the left memory location of the shift register 8 and fill this memory location automatically. In addition, time data (t) is inputted to the upper left memory location of the shift register 8 and provides the exact time point at which the measured values are written into the corresponding memory location. This is the sum of the clock pulse flanks of the clock signal since the start of the measuring sequence, which is counted by the counter 24, so that it can be precisely reconstructed at which time point the measurement values went into the shift register 8. The counter 24 is reset via the line "reset" at the start of a new measuring operation. The content of the particular memory locations is now shifted at the clock frequency of the subassembly 1 always by one position to the right so that the leftmost memory location can always be filled again with new measurement values. Should the control computer 4 not be able to read out the particular measured values promptly, then the measured values with the corresponding time data (t) during a time space of, for example, 10 clock pulses are buffered in the register 8. The subassembly 1 can then read out all 10 measured values via the read-write subassembly 10 from the register 8 and transmit them to the control computer 4 when the control computer is again active.

The operation of the second register 9 is similar wherein the desired drive values ($L_i$, $F_{des}$) are stored. Here, the desired drive values (which are computed in advance, for example, for 10 clock pulses) are written into the register 9 at the command of the control computer unit (3, 4, 5) together with corresponding time data (t) via the read-write assembly group 10. The time information (t) is likewise computed in advance in the control computer and the desired drive values are the desired position values $L_i$ and the desired measurement force values $F_{des}$. The register 9 is now filled with the desired drive values and is shifted to the right at clock frequency by one memory location so that, in the column of the register 9 farthest to the right, there are always the actual drive values present and these can be transmitted further to the corresponding drives, that is, to the measurement force generators 23 and the drives of the coordinate measuring apparatus 14. In this way, it is possible that the control computer unit (3, 4, 5) cannot supply desired drive values during a number of clock pulses and the coordinate measuring apparatus can nonetheless continue to perform the previously defined measuring sequence.

After the control computer is again active in such a case, in a next step, the memory locations of the register 9 which have been emptied can be correspondingly refilled. Furthermore, it is also possible to overwrite the above-described memory locations of the register 9 with new data when, for example, the actual geometry of the workpiece deviates from the desired geometry and therefore the desired position values L for driving the drive 14 must be revised.

At this point, it should be emphasized that it is the object of the control arrangement to always read out by the computer unit (3, 4, 5) the most current measurement values from the left column of the shift register 8 in real time as well as to update the desired drive values in the right column of the shift register 9 in real time operation. This requirement results from the fact that, for a deviation of the workpiece relative to its desired contour, the desired position values $L_i$ must be readjusted as early as possible in order to hold the probe pin 8 in its permissible deflection range. The buffering of the measured values and the desired drive values in the shift registers (8, 9) only takes place in order to ensure a trouble-free further operation of the coordinate measuring apparatus in time intervals in which the control computer (3, 4, 5) cannot process these values.

With respect to the clock signal for the subassembly 1 and the subassemblies (13, 16, 19) and 22 it should be further noted that the clock signal is here for the entire system and serves to synchronize the measuring sequence and therefore has a clock frequency of, for example, 1 KHz. The clock frequency has nothing to do with the operating clock frequency of the single-chip controller or the control computer which is usually greater than 1 MHz.

The clock frequency can, for example, be derived from the operating frequency of the control computer unit (3, 4, 5) in that the operating clock frequency is subdivided to a relatively low clock pulse rate. Of course, a clock generator, which is independent of the control computer, can also be used.

The synchronization of the write-in operation into the shift register 9 should take place in that the control computer unit (3, 4, 5) at first reads out the time data 8 of the left column and the shift register is then filled correspondingly with new desired drive values. The drive of individual components in the subassembly 1 takes place via a single-chip controller 11 which assumes organization of the individual components. The single-chip controller 11 is operatively connected to the control computer unit (3, 4, 5) and exchanges data Di therewith.

It is understood that the foregoing description is that of the preferred embodiments of the invention and that various changes and modifications may be made thereto without departing from the spirit and scope of the invention as defined in the appended claims.

What is claimed is:

1. A coordinate measuring apparatus having a component unit for measuring a workpiece, the apparatus comprising:
    a plurality of drives for moving said component unit to scan the workpiece;
    a control computer for sequentially generating pregiven sets of desired drive values ($L_i$, $F_{des}$) in accordance with which said drives are correspondingly adjusted at a fixed clock frequency;
    scanning devices for detecting several measured sets of values ($X_T$, $Y_T$, $Z_T$, $X_m$, $Y_m$, $Z_m$, $F_{ix}$, $F_{iy}$, $F_{iz}$) at said fixed clock frequency during a measuring sequence;
    said control computer having an operating system without real-time performance wherein said desired drive values are computed;
    a subassembly operating to execute at least one of the following functions:
        (a) several sets of said desired drive values are stored in advance in response to a command of said control computer and to which said drives are to be moved in the next clock pulses; and, automatically outputting said sets of desired drive values to said plurality of drives at said fixed clock frequency; and,
        (b) storing said measurement values ($X_T$, $Y_T$, $Z_T$, $X_m$, $Y_m$, $Z_m$, $F_{ix}$, $F_{iy}$, $F_{iz}$) and transmitting said measurement values ($X_T$, $Y_T$, $Z_T$, $X_m$, $Y_m$, $Z_m$, $F_{ix}$, $F_{iy}$, $F_{iz}$) to said control computer in response to a command therefrom.

2. The coordinate measuring apparatus of claim 1, wherein said subassembly is so configured that at least one of said desired drive values ($L_i$, $F_{des}$) and said measurement values ($X_T$, $Y_T$, $Z_T$, $X_m$, $Y_m$, $Z_m$, $F_{ix}$, $F_{iy}$, $F_{iz}$) are stored together with a time data (t) which gives the time point in the measuring sequence at which the particular desired drive values ($L_i$, $F_{des}$) are moved to and/or the measured values are detected.

3. The coordinate measuring apparatus of claim 2, wherein said time data (t) is the counted clock pulses since the start of the measuring sequence.

4. The coordinate measuring apparatus of claim 1, further comprising a counter for making said time data (t) available for said measurement values; and, a device for incrementing said counter at said fixed clock frequency.

5. The coordinate measuring apparatus of claim 4, wherein said subassembly includes at least one shift register wherein at least one of the following is stored: said desired drive values ($L_i$, $F_{des}$); said measurement values ($X_T$, $Y_T$, $Z_T$, $X_m$, $Y_m$, $Z_m$, $F_{ix}$, $F_{iy}$, $F_{iz}$); and, said time data (t).

6. The coordinate measuring apparatus of claim 5, wherein said subassembly further includes a write-read unit for writing into or reading out of said shift register.

7. The coordinate measuring apparatus of claim 6, wherein said subassembly further includes a single chip controller which administers at least one of the following: said shift register; said counter; and, said write-read unit.

8. The coordinate measuring apparatus of claim 1, said subassembly including at least one microprocessor for emulating at least one of the following:
    (a) a shift register wherein at least one of the following is stored: said desired drive values ($L_i$, $F_{des}$); said measurement values ($X_T$, $Y_T$, $Z_T$, $X_m$, $Y_m$, $Z_m$, $F_{ix}$, $F_{iy}$, $F_{iz}$); and said time data (t);
    (b) a counter for making said time data (t) available for said measurement values; and,
    (c) a write-read unit for writing into or reading out of said shift register.

9. A method for controlling a coordinate measuring apparatus having a control computer and drives for moving a component unit for scanning a workpiece, the method comprising the steps of:
    detecting measurement values ($X_T$, $Y_T$, $Z_T$, $X_m$, $Y_m$, $Z_m$, $F_{ix}$, $F_{iy}$, $F_{iz}$) of a measuring sequence at a pregiven clock frequency;
    generating desired drive values for subsequently adjusting the drives of said apparatus when processing said desired drive values at a defined clock frequency with said desired drive values being computed in advance in a computer having an operating system without real-time performance;
    storing said desired drive values in a subassembly and reading out and transmitting said desired drive values at a fixed clock frequency to said drives; and/or,
    storing several of said measurement values ($X_T$, $Y_T$, $Z_T$, $X_m$, $Y_m$, $Z_m$, $F_{ix}$, $F_{iy}$, $F_{iz}$) of said measuring sequence and transmitting said measurement values for evaluation by said control computer in response to a command of said control computer.

10. The method of claim 9, wherein said subassembly is so configured that at least one of said desired drive values ($L_i$, $F_{des}$) and said measurement values ($X_T$, $Y_T$, $Z_T$, $X_m$, $Y_m$, $Z_m$, $F_{ix}$, $F_{iy}$, $F_{iz}$) are stored together with a time data (t) which gives the time point in the measuring sequence to which the particular desired drive values ($L_i$, $F_{des}$) are moved and/or the measured values are picked up.

11. The method of claim 10, wherein said time data (t) is the counted clock pulses since the start of the measuring sequence.

12. The coordinate measuring apparatus of claim 1, wherein said desired drive values, which are to be moved to in the next clock pulses, are so stored that also existing desired drive values are made current by recorrected desired values.

13. The method of claim 9, wherein said desired drive values, which are to be moved to in the next clock pulses, are so stored that also existing desired drive values are made current by recorrected desired values.

* * * * *